Jan. 6, 1970  A. E. COX  3,488,087
ROLL TRAILER TOP
Filed Aug. 12, 1968
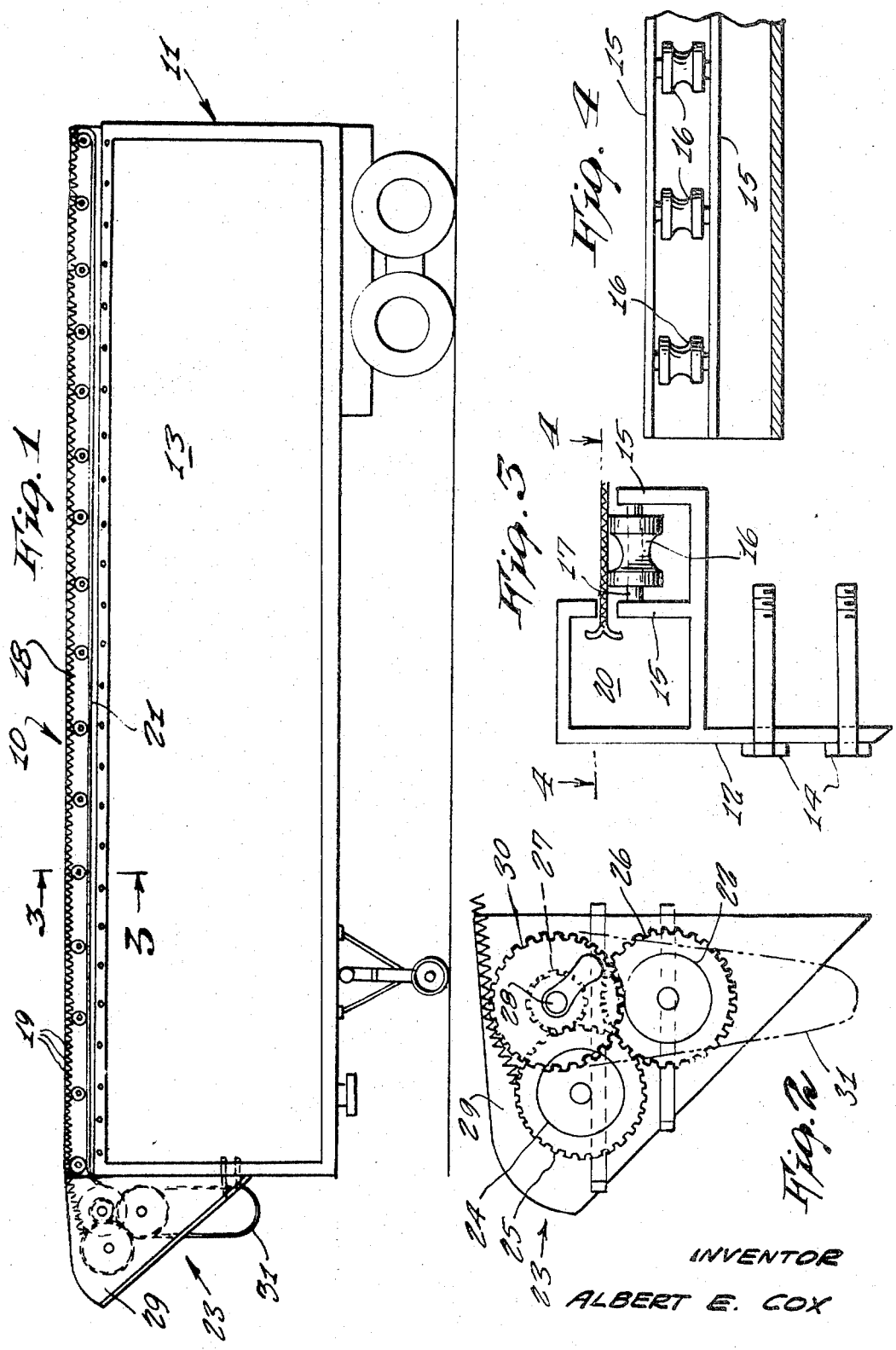
INVENTOR
ALBERT E. COX United States Patent Office 3,488,087
Patented Jan. 6, 1970

3,488,087
ROLL TRAILER TOP
Albert E. Cox, 1148 Hartzell St.,
New Haven, Ind. 46774
Filed Aug. 12, 1968, Ser. No. 751,991
Int. Cl. B60p 7/02
U.S. Cl. 296—100     1 Claim

ABSTRACT OF THE DISCLOSURE

An improved trailer top for replacing a conventional canvas top, the roll trailer top including a lightweight aluminum roof comprised of collapsible components hingedly connected together so that the same may be withdrawn from across the roof of the trailer or selectively returned so as to enclose the same, the aluminum roof components being secured to a retrieving cable operated from a winch for drawing the aluminum roof into selected position.

---

This invention relates generally to trailer tops.

It is generally well known that conventional trailer tops are made of canvas which is readily destructible upon hard use and which accordingly involves an expense to be replaced. This is of course objectionable and in want of improvement.

Accordingly it is a principal object of the present invention to provide an improved trailer top for an automotive trailer which is made of aluminum components to form a roof that is readily slidable into a closed or an open position upon the trailer roof.

Another object of the present invention is to provide an improved trailer top which is mounted upon rollers so that the trailer top may be readily moved between an open and a closed position.

Another object of the present invention is to provide a roll trailer top that is designed to protect freight on long eliminate the heavy losses caused by wind and other obstacles tearing holes into the canvas.

Another object of the present invention is to provide a roll trailer top that is designed to protect freight on long hauls such as railroad piggyback operation or over the road of highways.

Another object of the present invention is to provide a roll trailer top made of aluminum which will deter thieves from gaining access to the merchandise contained within the trailer when the same is parked or when in transit upon a railroad.

Yet a further object of the present invention is to provide a roll trailer top which can be easily rolled into a retracted position during loading operation so as to allow an overhead crane or a fork lift truck to gain access from above to the trailer body.

Yet a further object is to provide a roll trailer top which can be rolled up completely out of the way so to uncover the trailer bdy in full thereby allowing long articles to be easily positioned within the trailer by an overhead crane.

Other objects of the present invention are to provide a roll trailer top which is simple in design, inexpensive to manufacture, rugged in construction, easy to use and efficient in operation.

These and other objects will be readily evident upon a study of the following specification and the accompanying drawing wherein:

FIGURE 1 is a side elevation view of an automotive trailer shown incorporating the present invention;

FIGURE 2 is an enlarged detail view of the gearing thereof;

FIGURE 3 is an enlarged cross sectional view taken on the line 3—3 of FIG. 1; and FIGURE 4 is a fragmentary top plan view thereof as viewed along line 4—4 of FIGURE 3.

Referring now to the drawing in detail, the reference numeral 10 represents a roll trailer top according to the present invention wherein the device may be mounted upon an automotive trailer 11.

The trailer top includes a pair of longitudinally extending brackets 12 mounted along the upper edges of the opposite side walls 13 of the trailer 11 by means of bolts 14. Each of the brackets comprises a structure including a pair of vertically extending, spaced apart flanges 15 between which a plurality of rollers 16 are mounted pivotally free about pins 17 supported in the flanges.

An aluminum roof 18 in comprised of a plurality of laterally extending or transverse aluminum strips 19 hingedly enjoined together so that when in an extended position the same will enclose the upper side of the trailer body. The ends of the aluminum roof, as shown in FIGURE 3 of the drawing, extend into a longitudinally extending channel 20 which forms a moisture drain trap formed in the bracket 12 so as to prevent rain or other moisture from dripping into the trailer where it would damage the merchandise.

The aluminum roof 18 is connected to a retrieving cable 21 which extends around all the rollers 16, the retrieving cable having the roof components forming the rear edge of the roof secured thereto, the opposite end of the retrieving cable being wound upon a drum 22 within a gear unit 23 located at the forward end of the trailer. The gear unit further includes a drum 24 upon which the flexible aluminum top is rolled between an open and a closed position over the trailer body. A gear 25 is secured to the drum 24, and a gear 26 is secured to the drum 22, the gear 26 engaging the gear 25, and the gear 25 engaging a gear 27 carried upon cross shaft 28 journaled at its opposite ends within borings formed upon side walls 29 of the gear unit. The shaft 28 also carries secured thereto a chain lift hoist 30 which is manually operated by a depending endless chain 31 so as to selectively draw the roll top 18 between an open and a closed position across the trailer and form a roof for the same.

In operative use, the aluminum roof can be easily moved a selected distance as is desired so to enclose the trailer against weather and against unauthorized access to the freight contained within the trailer body.

While various changes may be made in the detailed construction, it is understood that such changes will be within the spirit and scope of the present invention.

I claim:

1. In a roll trailer top for an automotive trailer, the combination of a pair of brackets, each one of said brackets being secured along an upper edge of a side wall forming a trailer body, each of said brackets having self-contained means slidably receiving a rollable roof thereupon, and means for manually moving said rollable roof between an open and a closed position over said trailer body, each of said brackets comprising an elongated member including a side wall having a plurality of openings therein receiving mounting screws secured to said side wall of said trailer body, each said bracket further including a pair of spaced apart, vertically extending flanges between which a plurality of rollers are mounted rotatably free upon shafts mounted within bearings within said flanges, and said rollable roof being supported upon said rollers, each of said brackets further including a longitudinal channel having an opening along one side thereof, the side edge of said rollable roof extending through said opening into said channel, said channel comprising a moisture drain trap, said rollable roof being comprised of a plurality of aluminum strips extending transversely between said brackets, said aluminum strips being hingedly enjoined together so to be readily retractable between a closed and an open position across said trailer body, a rearmost end of said aluminum strips being enjoined to one end of a retrieving cable passed around said rollers, the opposite end of said retrieving cable being secured to a drum within a gear unit, said gear unit comprising a housing containing said drum, a drum comprising a second drum having one end of said rollable roof secured thereto, said drums being rotatable about cross-shafts, a gear on each of said cross-shafts, said gears being in toothed engagement with each other and with a third gear upon a cross-shaft carrying a chain-lift hoist, said chain-lift hoist having a depending chain for manual operation.

References Cited

UNITED STATES PATENTS

| | | | |
|---|---|---|---|
| 379,614 | 3/1888 | Smith | 160—265 |
| 1,969,595 | 8/1934 | D'Ornellas | 296—137 |
| 2,248,538 | 7/1941 | Liebler | 160—133 |
| 2,350,287 | 5/1944 | Michelman | 160—133 |
| 2,997,967 | 8/1961 | Malapert | 296—100 |

LEO FRIAGLIA, Primary Examiner

R. R. SONG, Assistant Examiner